United States Patent
Thelin

(10) Patent No.: US 6,711,628 B1
(45) Date of Patent: Mar. 23, 2004

(54) DISK DRIVE ABORTING A WRITE COMMAND BEFORE A LAST TARGET SECTOR REACHED IF AN ABNORMAL CONDITION DETECTED AND SELECTING A SECOND COMMAND ACCORDING TO A ROTATIONAL POSITIONING OPTIMIZATION ALGORITHM

(75) Inventor: Gregory B. Thelin, Garden Grove, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 238 days.

(21) Appl. No.: 10/080,850

(22) Filed: Feb. 22, 2002

(51) Int. Cl.7 ............................. G06F 13/14; G11B 5/58
(52) U.S. Cl. ................................ 710/6; 710/5; 710/39; 710/74; 711/112; 711/113; 369/53.1; 369/53.41; 369/53.42
(58) Field of Search ............................ 710/5, 6, 39, 74; 711/112, 113; 714/5, 8, 42; 360/77.04, 77.08; 369/53.1, 53.38, 53.41, 53.42

(56) References Cited

U.S. PATENT DOCUMENTS

| | | | |
|---|---|---|---|
| 4,888,691 A | 12/1989 | George et al. | |
| 5,991,825 A | 11/1999 | Ng | |
| 6,078,452 A | * 6/2000 | Kittilson et al. | ............... 360/61 |
| 6,272,565 B1 | 8/2001 | Lamberts | |
| 6,445,524 B1 | * 9/2002 | Nazarian et al. | ............... 360/49 |
| 6,452,735 B1 | * 9/2002 | Egan et al. | .................... 360/31 |
| 6,625,094 B1 | * 9/2003 | Park et al. | ............... 369/47.14 |
| 6,639,885 B1 | * 10/2003 | Yada et al. | ............... 369/53.45 |

* cited by examiner

Primary Examiner—Ilwoo Park
(74) Attorney, Agent, or Firm—Milad G. Shara, Esq.; Howard H. Sheerlin, Esq.

(57) ABSTRACT

A disk drive is disclosed wherein if a write command is aborted, the write command is re-executed according to a rotational position optimization (RPO) algorithm rather than immediately re-executing the write command to better optimize drive performance relative to mechanical latencies. An aborted write command is replaced into an input/output queue together with other pending commands. The aborted write command is eventually re-selected for execution by the RPO algorithm when executing the write command minimizes mechanical latencies relative to the other pending commands.

20 Claims, 6 Drawing Sheets

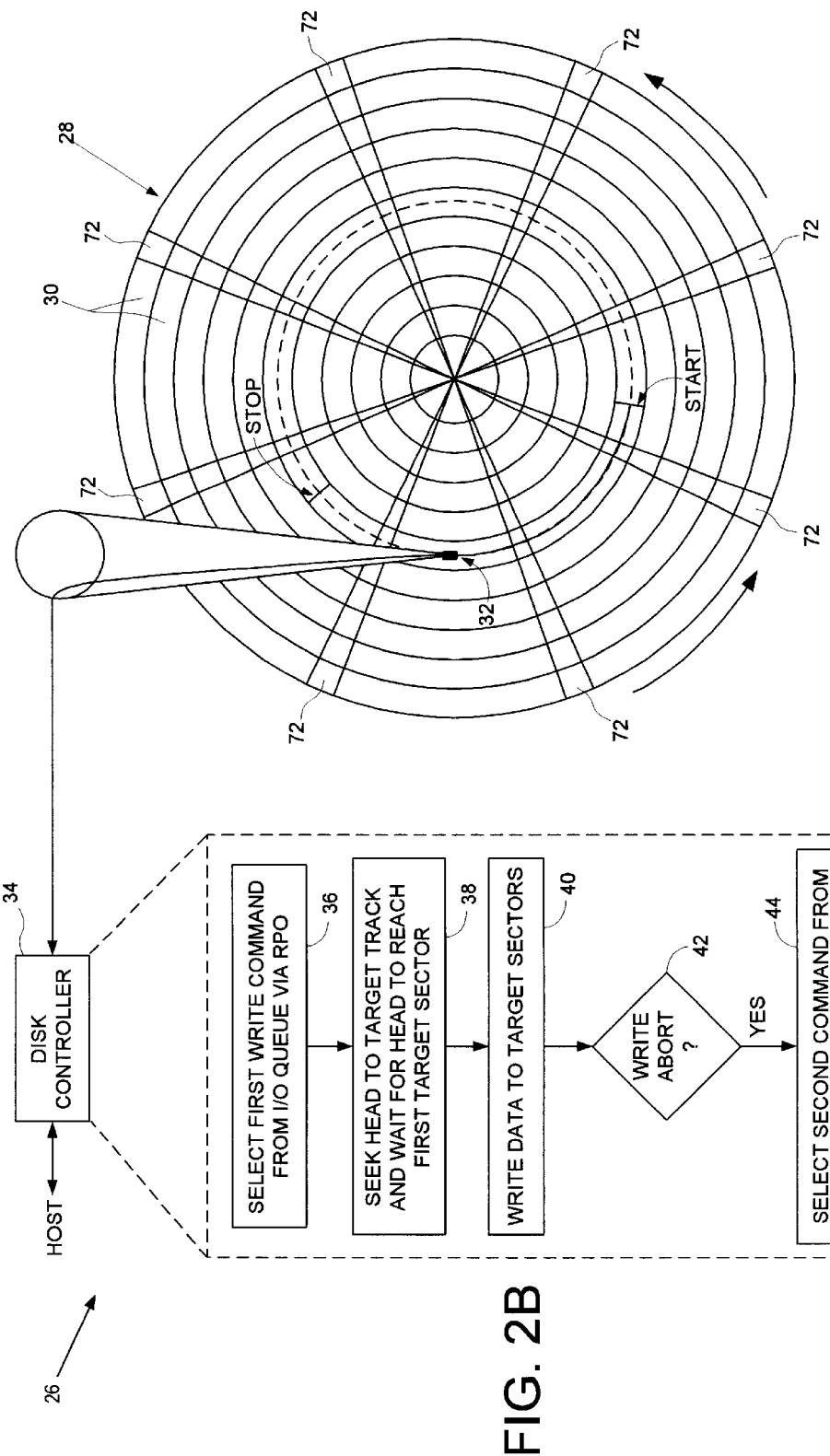

DISK DRIVE ABORTING A WRITE COMMAND BEFORE A LAST TARGET SECTOR REACHED IF AN ABNORMAL CONDITION DETECTED AND SELECTING A SECOND COMMAND ACCORDING TO A ROTATIONAL POSITIONING OPTIMIZATION ALGORITHM

BACKGROUND OF THE INVENTION

1. Field of the Invention

The present invention relates to disk drives. More particularly, the present invention relates to a disk drive using a rotational position optimization (RPO) algorithm to facilitate write abort operations.

2. Description of the Prior Art

FIG. 1A shows a prior art disk drive 2 comprising a disk 4 for recording a plurality of concentric tracks 6. Each track 6 is partitioned into a number of data sectors for storing user data. A head 8 is connected to a distal end of an actuator arm 10 which is rotated about a pivot in order to actuate the head 8 radially over the disk 4. The disk 4 further comprises a plurality of embedded servo sectors 12 processed to maintain the head 4 over the centerline of a target track during read and write operations.

A disk controller 14 controls the operation of the disk drive 2 by executing read and write commands received from a host computer. The commands received from the host are inserted into an input/output (I/O) queue and executed according to a rotational position optimization (RPO) algorithm. The RPO algorithm is used by the disk controller 14 to select commands from the I/O queue in an order that will optimize performance with respect to the mechanical latencies of the disk drive, including the seek latency of the head 8 and the rotational latency of the disk 4.

FIG. 1B shows a flow diagram of the steps executed by the disk controller 14 while executing a write operation. At step 16, a write command is selected from the I/O queue according to the RPO algorithm (as determined from the current radial and circumferential location of the head 8 and other commands in the I/O queue). At step 18, the disk controller 14 seeks the head 8 to a target track comprising target data sectors to be written, and then waits for the disk 4 to rotate until the head 8 is positioned over the first target data sector. Ideally the head will reach the target track at the end of a seek immediately preceding the first target data sector in order to minimize the rotational latency while waiting for the first target data sector to reach the head 8.

At step 20 the disk controller 14 writes the user data to the target data sectors, however, during this step various conditions may cause the disk controller 14 to abort the write operation. For example, if the embedded servo sectors 12 indicate that the head 6 has deviated from the centerline of the target track (beyond a threshold), then the write is aborted. The disk drive may also employ a shock detector for detecting physical shocks to the disk drive. If the shock detector indicates the disk drive has been subjected to a substantial shock exceeding a threshold, the write may be aborted. The write may also be aborted if an abnormal fly-height is detected for the head 8, or if the head 8 strikes an asperity on the disk 4 causing an abnormal thermal response (thermal asperity).

If the prior art disk drive of FIG. 1A aborts the write operation at step 22, then at step 24 the disk controller 14 waits for the disk 4 to rotate until the head 8 again reaches the first target data sector. The disk controller 14 will then rewrite the user data to the target track at step 20. This procedure is iterated until the user data is successfully written to the target track without aborting the write operation at step 22. However, waiting for the head 8 to reach the first target data sector after an aborted write operation degrades performance due to the undesirable rotational latency of the disk 4. This is illustrated in FIG. 1A wherein as the disk 4 rotates in a counter clockwise direction, the write operation begins at the START location and aborts the operation before reaching the STOP location. The disk controller 14 then waits at step 24 for the disk to rotate until the head 8 again reaches the START location. On average, the rotational latency will equal one-half a rotation of the disk 4.

There is, therefore, a need for a disk drive which aborts write operations more efficiently so as to improve performance with respect to the rotational latency of the disk.

SUMMARY OF THE INVENTION

The present invention may be regarded as a disk drive comprising a disk having a plurality of concentric tracks, each track comprising a plurality of data sectors, and a head actuated radially over the disk. The disk drive further comprises an input/output queue for storing read and write commands received from a host computer, and a disk controller for executing the commands stored in the input/output queue in an order determined from a rotational positioning optimization (RPO) algorithm. The disk controller selects a first write command from the input/output queue according to the RPO algorithm, the first write command for writing user data to a plurality of target data sectors including a first target data sector and a last target data sector. The disk controller seeks the head to a target track comprising the target data sectors, waits for the disk to rotate until the head reaches the first target data sector, and begins writing user data to at least the first target data sector. If an abnormal condition is detected, the first write command is aborted before reaching the last target data sector and a second command is selected from the input/output queue according to the RPO algorithm. If the second command is the first write command, the second command is executed to write user data to at least one of the plurality of target data sectors.

In one embodiment, the second command is executed by writing user data to each of the plurality of target data sectors. In an alternative embodiment, the disk controller modifies the first write command so that when the second command is executed user data is written to a plurality of the target data sectors that follow the data sector where the first write command was aborted.

In one embodiment, the disk drive further comprises a semiconductor memory for caching the user data corresponding to the first write command, wherein the disk controller de-allocates the memory storing at least part of the user data after executing the second command. In one embodiment if the amount of free memory decreases to a predetermined limit, the disk controller expedites execution of the second command.

In one embodiment, the abnormal condition is detected if the head deviates beyond a threshold from a centerline of the target track while executing the first write command. In one embodiment, the head generates a read signal and the abnormal condition is detected if the read signal exceeds a threshold for a predetermined interval. In one embodiment, the abnormal condition is detected if the head is flying at an abnormal height, and in one embodiment, the abnormal condition is detected if the head strikes an asperity on the disk. The present invention may also be regarded as a method of aborting a write operation in a disk drive, the disk drive comprising a disk having a plurality of concentric tracks including a plurality of data sectors, a head actuated radially over the disk, and an input/output queue for storing read and write commands received from a host computer. A first write command is selected from the input/output queue according to a rotational position optimization (RPO) algorithm, the first write command for writing user data to a plurality of target data sectors including a first target data sector and a last target data sector. The head is positioned over the target track comprising the target data sectors, and when the disk rotates so that the first target data sector reaches the head, user data is written to at least the first target data sector. If an abnormal condition is detected, the first write command is aborted before reaching the last target data sector, and a second command is selected from the input/output queue according to the RPO algorithm. If the second command is the first write command, the second command is executed to write user data to at least one of the target data sectors.

BRIEF DESCRIPTION OF THE DRAWINGS

FIGS. 2A and 2B show a disk drive according to an embodiment of the present invention wherein when a first write command is aborted a second command is selected from the input/output queue according to an RPO algorithm and executed.

DESCRIPTION OF THE PREFERRED EMBODIMENTS

Figure 1A:
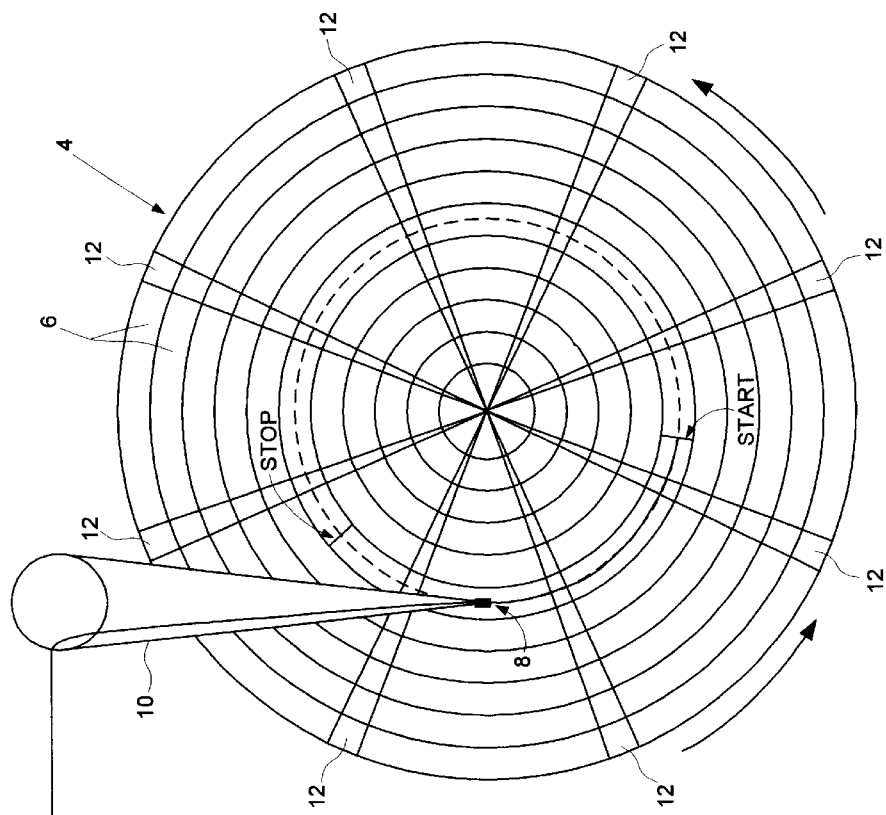
FIGS. 1A and 1B show a prior art disk drive wherein write commands are immediately re-executed when a write abort occurs.
Figure 1B:
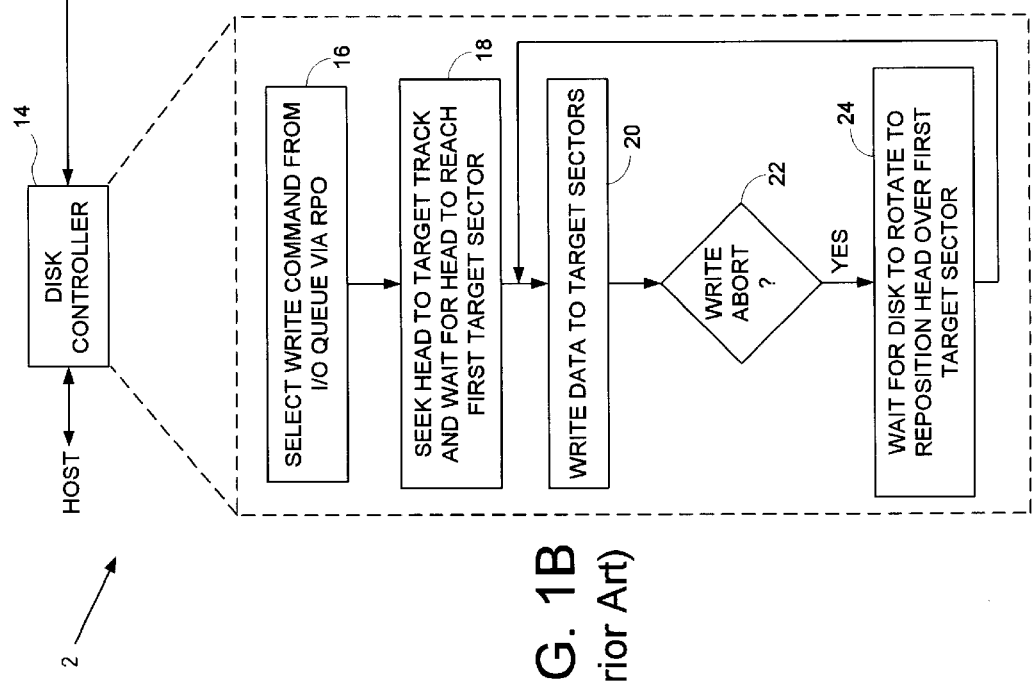

FIG. 2A shows a disk drive 26 according to an embodiment of the present invention comprising a disk 28 having a plurality of concentric tracks 30, each track 30 comprising a plurality of data sectors, and a head 32 actuated radially over the disk 28. The disk drive 26 further comprises an input/output (I/O) queue for storing read and write commands received from a host computer, and a disk controller 34 for executing the commands stored in the input/output queue in an order determined from a rotational positioning optimization (RPO) algorithm. FIG. 2B is a flow diagram illustrating the steps executed by the disk controller 34 after receiving a plurality of commands from the host. At step 36 the disk controller 34 retrieves a first write command from the input/output queue according to the RPO algorithm, the first write command for writing user data to a plurality of target data sectors including a first target data sector and a last target data sector. At step 38 the disk controller 34 seeks the head 32 to a target track comprising the target data sectors, waits for the disk 28 to rotate until the head 32 reaches the first target data sector, and at step 40 begins writing user data to at least the first target data sector. If at step 42 an abnormal condition is detected, the first write command is aborted before reaching the last target data sector and at step 44 a second command is selected from the I/O queue according to the RPO algorithm. If the second command is the first write command, the second command is executed to write user data to at least one of the plurality of target data sectors.

Any suitable RPO algorithm may be employed in the present invention. In general, the RPO algorithm computes an estimated access time for each command in the I/O queue, taking into account the current radial and circumferential location of the head. The RPO algorithm selects the command having the least access time as the next command to execute. This enhances performance of the disk drive by maximizing efficiency relative to its mechanical latencies. When a write operation is aborted, the performance of the disk drive 26 in FIG. 2A is further enhanced by executing the next best command as determined from the RPO algorithm rather than immediately re-executing the same write command as in the prior art which must wait for the disk to rotate until the head is again over the first target data sector. In some cases it may be that an aborted write command is the next best command to execute as determined by the RPO algorithm. However, there are cases where it is more efficient to perform at least one other command (e.g., another write command to the same or proximate track) before re-executing the aborted write command.

Any suitable technique may be employed to ensure an aborted write command is eventually reselected by the RPO algorithm. In one embodiment, a write command is deleted from the I/O queue when selected for execution. If the write command is aborted, it is re-inserted into the I/O queue so that it is reconsidered by the RPO algorithm. In an alternative embodiment, a write command is deleted from the I/O queue only after it has been successfully executed. In this manner if a write command is aborted, it remains in the I/O queue and is reconsidered by the RPO algorithm until successfully executed. In yet another embodiment, the write command is modified so that when it is re-executed only the previously unwritten data sectors are written to the track.

Figure 3A:
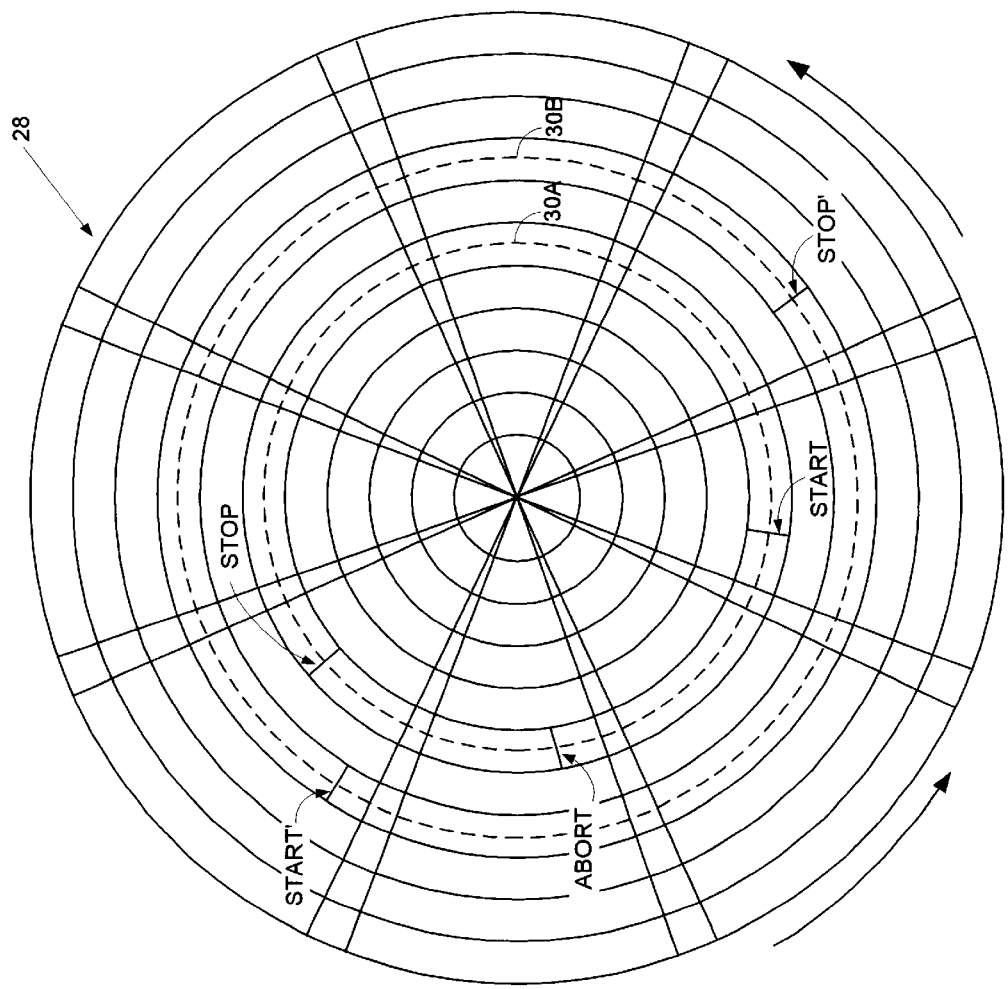
FIG. 3A illustrates an embodiment of the present invention wherein if a write command is aborted all of the target data sectors are written when it is re-executed.

FIG. 3A illustrates an embodiment of the present invention wherein if a first write command is aborted all of the target data sectors are written when it is re-executed. In this embodiment, the disk 28 rotates in a counter-clockwise direction. A first write command is inserted into the I/O queue to write user data to track 30A, and a second write command is inserted into the I/O queue to write user data to track 30B. When the first write command is selected by the RPO algorithm, the disk controller 34 seeks the head 32 to the track 30A. The disk 28 then rotates until the head 32 reaches the first target data sector designated by START. User data is then written to track 30A until the first write command is aborted at ABORT due to an abnormal condition. The RPO algorithm then selects the second write command as the most efficient command to execute next. The disk controller 34 seeks the head 32 to track 30B so that it reaches track 30B just before the START' of the second write command. User data is then written to track 30B as the disk 28 rotates. When the last target data sector is written at STOP', the RPO algorithm selects the first write command as the most efficient command to execute next. The disk controller 34 seeks the head 32 to track 30A so that it reaches track 30A just before the START of the first write command. User data is then written to all of the target data sectors as the disk 28 rotates until the end of the first write command is reached at STOP.

Figure 3B:
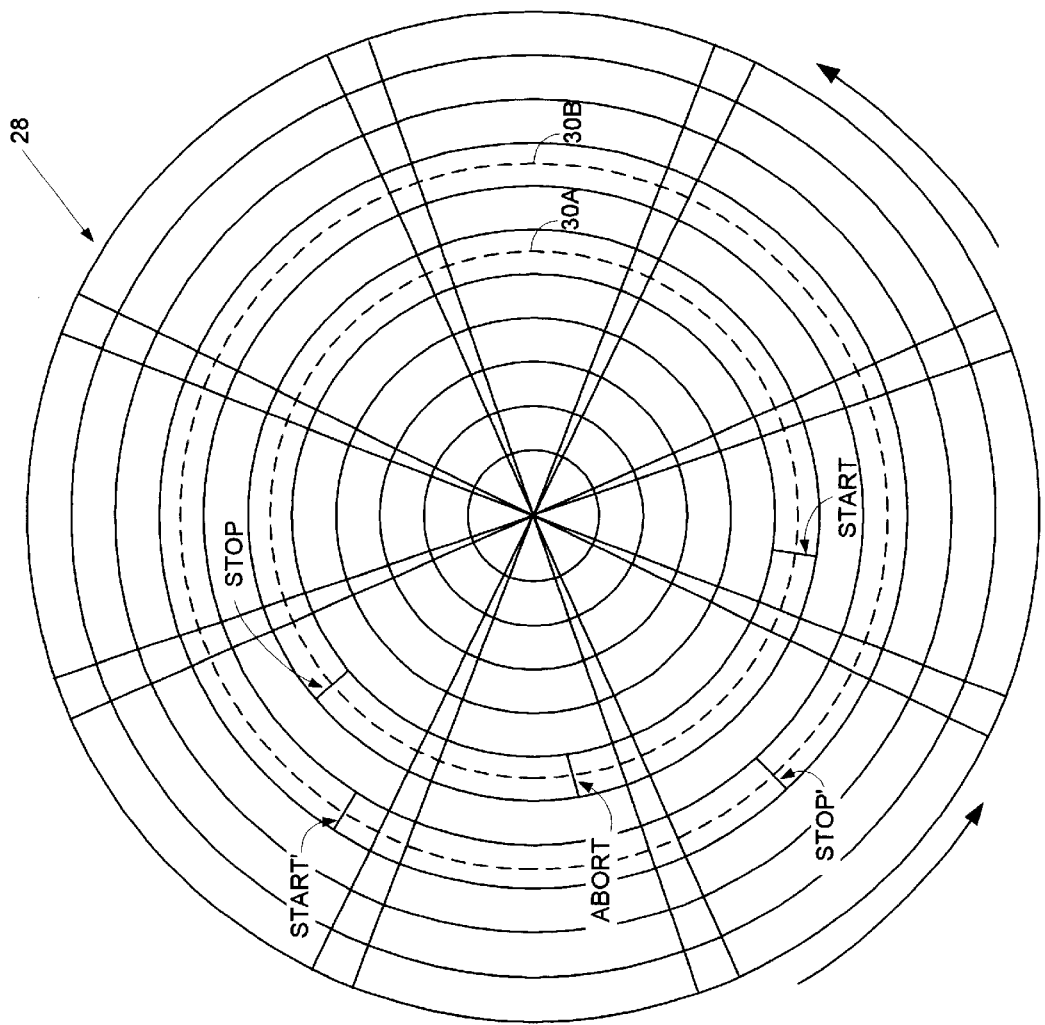
FIG. 3B illustrates an embodiment of the present invention wherein if a first write command is aborted only the unwritten data sectors are written when it is re-executed.

FIG. 3B illustrates an embodiment of the present invention wherein if a first write command is aborted only the unwritten data sectors are written when it is re-executed. A first write command is inserted into the I/O queue to write user data to track 30A, and a second write command is inserted into the I/O queue to write user data to track 30B. When the first write command is selected by the RPO algorithm, the disk controller 34 seeks the head 32 to the track 30A. The disk 28 then rotates until the head 32 reaches the first target data sector designated by START. User data is then written to track 30A until the first write command is aborted at ABORT due to an abnormal condition. The first write command is modified so that only the unwritten data sectors are written when it is re-executed. The RPO algorithm then selects the second write command as the most efficient command to execute next. The disk controller 34 seeks the head 32 to track 30B so that it reaches track 30B just before the START' of the second write command. User data is then written to track 30B as the disk 28 rotates. When the last target data sector is written at STOP', the RPO algorithm selects the first write command as the most efficient command to execute next. The disk controller 34 seeks the head 32 to track 30A so that it reaches track 30A just before the ABORT of the first write command. User data is then written only to the previously unwritten data sectors that follow the ABORT as the disk 28 rotates until the end of the first write command is reached at STOP.

Figure 4:
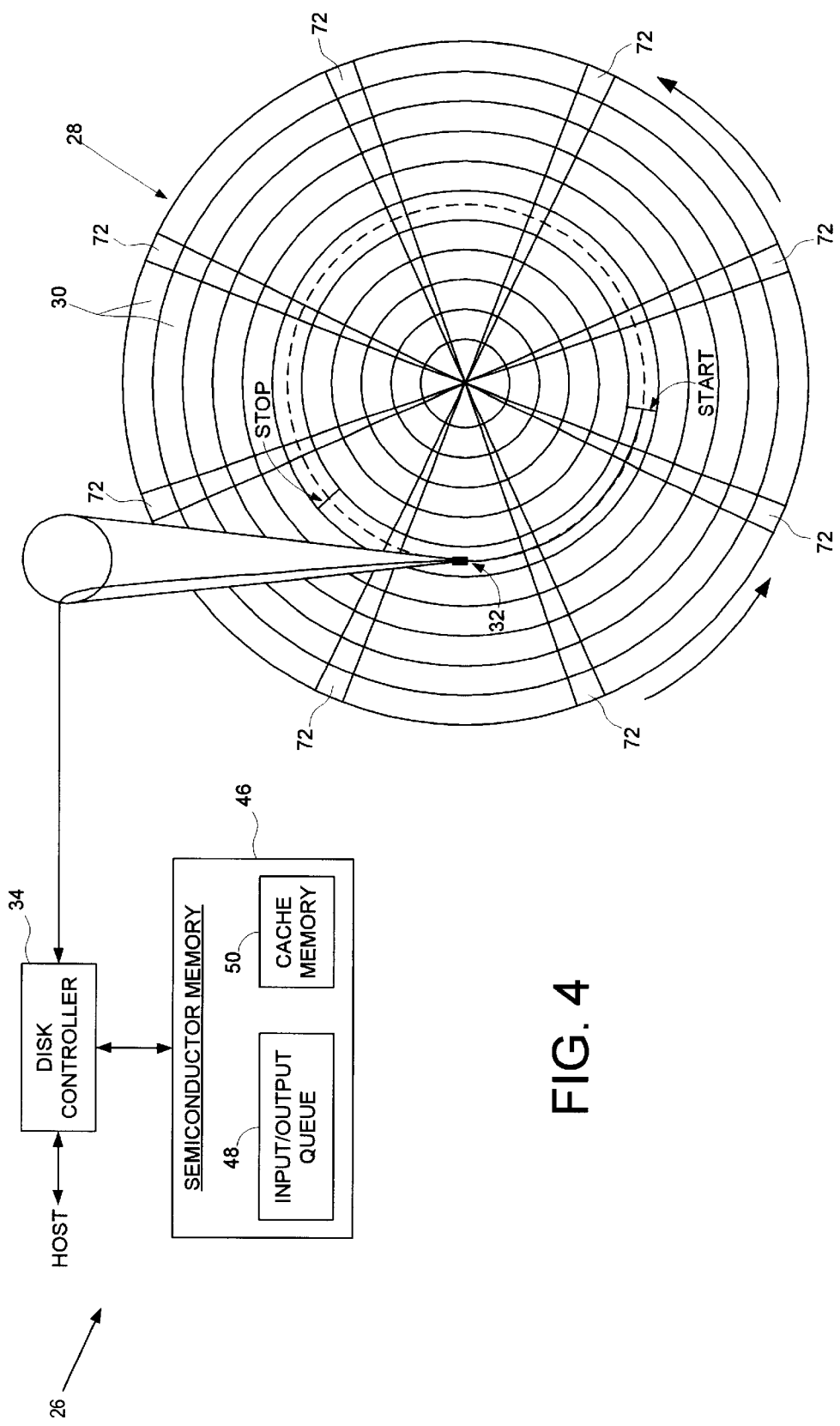
FIG. 4 shows a disk drive according to an embodiment of the present invention comprising a semiconductor memory for storing the I/O queue and a cache memory for caching user data associated with the commands in the I/O queue.

In an embodiment shown in FIG. 4, the disk drive 2 comprises a semiconductor memory 46 which may be volatile (e.g. DRAM) or non-volatile (e.g., FLASH). The semiconductor memory 46 stores the I/O queue 48 which may be implemented in any suitable manner, such as an array or linked list of pointers. The semiconductor memory 46 is also used to implement a cache memory 50 for caching user data associated with the read and write commands received from the host. When the disk drive 2 receives a write command from the host, the user data to be written to the disk is cached in the cache memory 50 until the write command is successfully executed. If the write command is aborted, the user data remains in the cache memory until the write command is re-executed according to the RPO algorithm. In one embodiment, if the amount of free memory in the cache memory 50 decreases to a predetermined limit, the pending write commands, including the aborted write commands, are expedited in order to free memory for subsequent commands.

Figure 5:
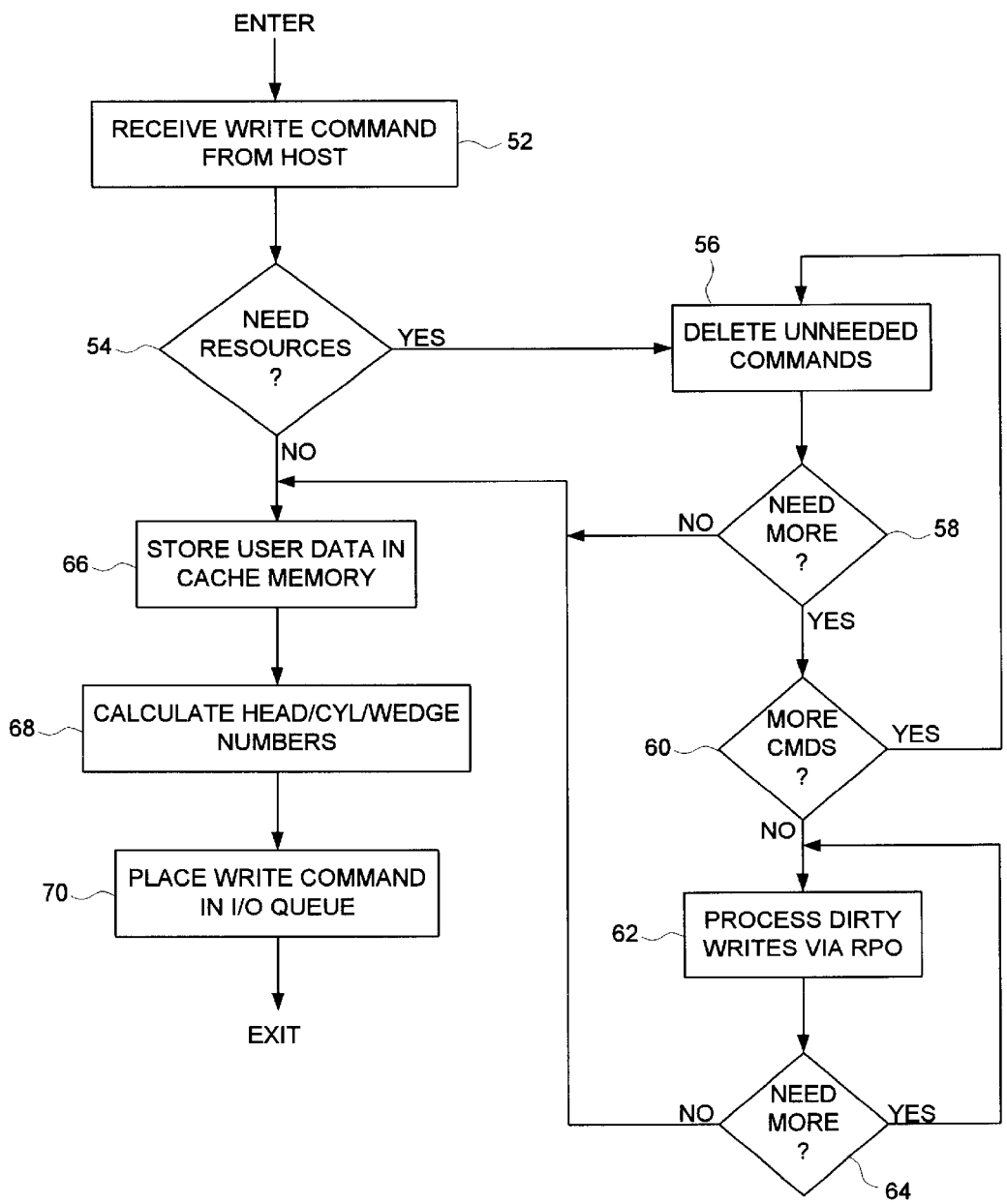
FIG. 5 is a flow diagram illustrating an embodiment of the present invention wherein when the cache memory is low the write commands in the I/O queue are expedited in order to free memory for new commands.

FIG. 5 is a flow diagram illustrating an embodiment of the present invention wherein when the cache memory 50 is low the pending write commands in the I/O queue, including the aborted write commands, are expedited in order to free memory for new commands. At step 52 the disk controller 34 receives a write command from the host, and at step 54 the disk controller 34 determines whether there are sufficient resources (e.g., cache memory) to process the requested command. If there are not sufficient resources, then at step 56 the disk controller 34 frees resources associates with unneeded commands, for example, by de-allocating cache memory associated with the least recently requested read or write commands that have, been successfully executed but which still have cached user data. If at step 58 resources are still necessary, at step 60 a check is made to determine if any other commands can be deleted at step 56. If not, then at step 62 the disk controller 34 flushes dirty write commands according to the RPO algorithm. A dirty write command is a write command which is pending execution and therefore has user data stored in the cache memory. Dirty write commands include write commands that were aborted due to an abnormal condition and are still in the I/O queue pending execution. In this manner, pending write commands (including aborted write commands) are expedited at step 62 by assigning a higher priority in the RPO algorithm than pending read commands. The dirty writes are processed at step 62 until sufficient resources are available at step 64 to process the new write command received from the host at step 52. At step 66 the user data associated with the new write command is stored in the cache memory 50, at step 68 head/cylinder/wedge numbers are calculated for the new write command, and at step 70 the new write command is placed in the I/O queue for processing according to the RPO algorithm.

The disk controller 34 may detect an abnormal condition and abort a write command for any number of reasons. In one embodiment, an abnormal condition is detected if the head 32 deviates beyond a threshold from a centerline of the target track. This condition may be detected by processing embedded servo sectors 72 (FIG. 2A) which comprise servo bursts that indicate the head's offset from the target track's centerline. In another embodiment, the disk drive 26 comprises a shock detector which detects physical shocks that may propagate through to the head 32. If a shock of significant magnitude is detected by exceeding a threshold, it is assumed the head 32 has deviated from the target track's centerline and a write command is aborted. In another embodiment, the disk controller 34 process the read signal emanating from the head 32 while reading the embedded servo sectors 72 to detect an abnormal condition. For example, if the read signal exceeds a threshold for a predetermined interval an abnormal condition may be detected due to the head striking an asperity on the surface of the disk 28 (i.e., a thermal asperity). In another example, if the read signal exceeds a threshold (upper or lower) for a predetermined interval, an abnormal fly height condition may be detected and the write command aborted.

The disk controller 34 comprises suitable circuitry and/or software for processing the commands received from the host, such as processor circuitry, interface circuitry, an error correction code (ECC), a read/write channel, servo control, etc.. The disk controller 34 may be implemented as a plurality of distinct integrated circuits, or as a single integrated circuit.

I claim:

1. A disk drive comprising:
   (a) a disk comprising a plurality of concentric tracks, each track comprising a plurality of data sectors;
   (b) a head actuated radially over the disk;
   (c) an input/output queue for storing read and write commands received from a host computer;
   (d) a disk controller for executing the commands stored in the input/output queue in an order determined from a rotational positioning optimization (RPO) algorithm, wherein the disk controller for:
   selecting a first write command from the input/output queue according to the RPO algorithm, the first write command for writing user data to a plurality of target data sectors including a first target data sector and a last target data sector;
   seeking the head to a target track comprising the target data sectors;
   waiting for the disk to rotate until the head reaches the first target data sector;

writing user data to at least the first target data sector;
if an abnormal condition is detected:
  aborting the first write command before reaching the last target data sector;
  selecting a second command from the input/output queue according to the RPO algorithm; and
  if the second command is the first write command, executing the second command by writing user data to at least one of the target data sectors.

2. The disk drive as recited in claim 1, wherein the second command is executed by writing user data to each of the plurality of target data sectors.

3. The disk drive as recited in claim 1, the disk controller modifies the first write command so that when the second command is executed user data is written to a plurality of the target data sectors that follow the data sector where the first write command was aborted.

4. The disk drive as recited in claim 1, further comprising a semiconductor memory for caching the user data corresponding to the write command, wherein disk controller de-allocates the memory storing at least part of the user data after executing the second command.

5. The disk drive as recited in claim 4, wherein if the amount of free memory decreases to a predetermined limit, the disk controller expedites execution of the second command.

6. The disk drive as recited in claim 1, wherein the abnormal condition is detected if the head deviates beyond a threshold from a centerline of the target track while executing the first write command.

7. The disk drive as recited in claim 1, wherein:
  (a) the head generates a read signal; and
  (b) the abnormal condition is detected if the read signal exceeds a threshold for a predetermined interval.

8. The disk drive as recited in claim 1, wherein the abnormal condition is detected if the head is flying at an abnormal height.

9. The disk drive as recited in claim 1, wherein the abnormal condition is detected if the head strikes an asperity on the disk.

10. A method of aborting a write operation in a disk drive, the disk drive comprising a disk having a plurality of concentric tracks including a plurality of data sectors, a head actuated radially over the disk, and an input/output queue for storing read and write commands received from a host computer, the method comprising the steps of:
  (a) selecting a first write command from the input/output queue according to a rotational position optimization (RPO) algorithm, the first write command for writing user data to a plurality of target data sectors including a first target data sector and a last target data sector;
  (b) seeking the head to a target track comprising the target data sectors;
  (c) waiting for the disk to rotate until the head reaches the first target data sector;
  (d) writing user data to at least the first target data sector;
  (e) if an abnormal condition is detected:
    aborting the first write command before reaching the last target data sector;
    selecting a second command from the input/output queue according to the RPO algorithm; and
    if the second command is the first write command, executing the second command to write user data to at least one of the target data sectors.

11. The method of aborting a write operation as recited in claim 10, wherein the step of executing the second command comprises the step of writing user data to each of the target data sectors.

12. The method of aborting a write operation as recited in claim 10, further comprising the step of modifying the first write command so that when the second command is executed user data is written to a plurality of the target data sectors that follow the data sector where the first write command was aborted.

13. The method of aborting a write operation as recited in claim 10, further comprising the steps of:
  (a) caching the user data corresponding to the first write command in a semiconductor memory; and
  (b) de-allocating the memory storing at least part of the user data after executing the second command.

14. The method of aborting a write operation as recited in claim 13, wherein if the amount of free memory decreases to a predetermined limit, the step of executing the second command is expedited.

15. The method of aborting a write operation as recited in claim 10, wherein the abnormal condition is detected if the head deviates beyond a threshold from a centerline of the target track while executing the first write command.

16. The method of aborting a write operation as recited in claim 10, wherein:
  (a) the head generates a read signal; and
  (b) the abnormal condition is detected if the read signal exceeds a threshold for a predetermined interval.

17. The method of aborting a write operation as recited in claim 10, wherein the abnormal condition is detected if the head is flying at an abnormal height.

18. The method of aborting a write operation as recited in claim 10, wherein the abnormal condition is detected if the head strikes an asperity on the disk.

19. A disk drive comprising:
  (a) a disk comprising a plurality of concentric tracks, each track comprising a plurality of data sectors;
  (b) a head actuated radially over the disk;
  (c) an input/output queue for storing read and write commands received from a host computer;
  (d) a disk controller for executing the commands stored in the input/output queue in an order determined from a rotational positioning optimization (RPO) algorithm, wherein the disk controller for:
    selecting a first write command from the input/output queue according to the RPO algorithm, the first write command for writing user data to a plurality of target data sectors including a first target data sector and a last target data sector;
    seeking the head to a target track comprising the target data sectors;
    waiting for the disk to rotate until the head reaches the first target data sector;
    writing user data to at least the first target data sector;
    if an abnormal condition is detected:
      aborting the write command before reaching the last target data sector;
      selecting a second command from the input/output queue according to the RPO algorithm; and
      if the second command is the first write command, executing the second command by writing user data to a plurality of the target data sectors that follow the target data sector where the first write command was aborted.

20. A method of aborting a write operation in a disk drive, the disk drive comprising a disk having a plurality of concentric tracks including a plurality of data sectors, a head actuated radially over the disk, and an input/output queue for storing read and write commands received from a host computer, the method comprising the steps of:

(a) selecting a first write command from the input/output queue according to a rotational position optimization (RPO) algorithm, the first write command for writing user data to a plurality of target data sectors including a first target data sector and a last target data sector;

(b) seeking the head to a target track comprising the target data sectors;

(c) waiting for the disk to rotate until the head reaches the first target data sector;

(d) writing user data to at least the first target data sector;

(e) if an abnormal condition is detected:

aborting the first write command before reaching the last target data sector;

selecting a second command from the input/output queue according to the RPO algorithm; and if the second command is the first command, executing the second command by writing user data to a plurality of the target data sectors that follow the target data sector where the first write command was aborted.

* * * * *